United States Patent
Zhang et al.

(10) Patent No.: US 9,294,960 B2
(45) Date of Patent: Mar. 22, 2016

(54) METHOD, APPARATUS AND SYSTEM FOR COOPERATIVE RESOURCE SCHEDULING AND COOPERATIVE COMMUNICATION

(75) Inventors: Gong Zhang, Shenzhen (CN); Xun Yang, Shenzhen (CN); Cheng He, Shenzhen (CN); Lujia Pan, Shenzhen (CN); Dayang Feng, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 608 days.

(21) Appl. No.: 13/339,171

(22) Filed: Dec. 28, 2011

(65) Prior Publication Data

US 2012/0230264 A1 Sep. 13, 2012

Related U.S. Application Data

(63) Continuation of application No. PCT/CN2010/078710, filed on Nov. 15, 2010.

(30) Foreign Application Priority Data

Feb. 11, 2010 (CN) .......................... 2010 1 0113795

(51) Int. Cl.
*H04W 4/00* (2009.01)
*H04W 28/16* (2009.01)
(Continued)

(52) U.S. Cl.
CPC .............. *H04W 28/16* (2013.01); *H04W 72/04* (2013.01); *H04W 76/00* (2013.01); *H04W 48/16* (2013.01); *H04W 88/08* (2013.01)

(58) Field of Classification Search
CPC ..... H04W 72/04; H04W 88/08; H04W 76/00; H04W 28/16; H04W 48/16
See application file for complete search history.

(56) References Cited

U.S. PATENT DOCUMENTS

| 8,675,511 B2* | 3/2014 | Gorokhov et al. ............. 370/252 |
| 2004/0018849 A1* | 1/2004 | Schiff .................. H04W 52/267 |
| | | 455/522 |

(Continued)

FOREIGN PATENT DOCUMENTS

| CN | 1964511 A | 5/2007 |
| CN | 101141776 A | 3/2008 |

(Continued)

OTHER PUBLICATIONS

Written Opinion of the International Searching Authority issued in corresponding PCT Patent Application No. PCT/CN2010/078710, mailed Feb. 24, 2011.

(Continued)

*Primary Examiner* — Lonnie Sweet
(74) *Attorney, Agent, or Firm* — Brinks Gilson & Lione

(57) ABSTRACT

A method, an apparatus and a system for cooperative resources scheduling and cooperative communication are provided. The method for cooperative resources includes: obtaining, by a network central controller, statistical information of all the users dominated by it in a first time period, dividing base stations to base station cooperative clusters according to the statistical information, and transmitting cooperative cluster dividing result to the base stations. The corresponding method and apparatus for cooperative communication are also provided. The solutions of the embodiments of the present disclosure can increase the transmission rate and user experience for the users at the edge of the cooperative cluster, and improve the fairness of the system users, while reducing the signaling overhead of the system, separating the computational tasks and reducing the difficulty of implementing the whole system.

22 Claims, 6 Drawing Sheets

(51) Int. Cl.
*H04W 76/00* (2009.01)
*H04W 72/04* (2009.01)
*H04W 48/16* (2009.01)
*H04W 88/08* (2009.01)

(56) References Cited

U.S. PATENT DOCUMENTS

| | | | |
|---|---|---|---|
| 2004/0082363 A1* | 4/2004 | Hosein | 455/560 |
| 2007/0149236 A1 | 6/2007 | Naden et al. | |
| 2007/0280175 A1 | 12/2007 | Cheng et al. | |
| 2008/0298486 A1 | 12/2008 | Venturino et al. | |
| 2009/0082028 A1* | 3/2009 | Hosein et al. | 455/450 |
| 2010/0034151 A1* | 2/2010 | Alexiou et al. | 370/329 |
| 2010/0056215 A1* | 3/2010 | Gorokhov et al. | 455/561 |
| 2011/0044314 A1* | 2/2011 | Calvanese Strinati | H04L 5/006 370/344 |
| 2012/0281648 A1* | 11/2012 | Dahrouj | H04W 52/241 370/329 |

FOREIGN PATENT DOCUMENTS

| | | |
|---|---|---|
| CN | 101389115 A | 3/2009 |
| CN | 101461268 A | 6/2009 |
| CN | 101877918 A | 11/2010 |
| WO | WO 2009049516 A1 | 4/2009 |
| WO | WO 2010124647 A1 | 11/2010 |

OTHER PUBLICATIONS

International Search Report issued in corresponding PCT Patent Application No. PCT/CN2010/078710, mailed Feb. 24, 2011.
Skjevling et al., "Low-Complexity Distributed Multibase Transmission and Scheduling" EURASIP Journal on Advances in Signal Processing, 2008.
Extended European Search Report issued in corresponding European Patent Application No. 10845576.7, mailed Mar. 8, 2012.
Huang et al., "Performance of Multiuser MIMO and Network Coordination in Downlink Cellular Networks" Conference on Modeling and Optimization in Mobile, Ad Hoc, and Wireless Networks and Workshops, WIOPT. Apr. 2008.
Papadogiannis et al., "A Dynamic Clustering Approach in Wireless Networks with Multi-Cell Cooperative Processing" IEEE International Conference on Communications, 2008.
Thiele et al., "Cooperative Multi-User MIMO Based on Limited Feedback in Downlink OFDM Systems" Signals, $42^{nd}$ Asilomar Conference on Systems and Computers, Oct. 2008.
Nortel, "Clustering for CoMP Transmission" Agenda Item 12.3, 3GPP TSG-RAN Working Group 1 Meeting #55b. Ljubljana, Slovenia, Jan. 12-16, 2009.
Office Action issued in corresponding Chinese Patent Application No. 201010113795.9, mailed Aug. 31, 2012.
Search Report issued in corresponding Chinese Patent Application No. 201010113795.9, mailed Aug. 31, 2012.

* cited by examiner

METHOD, APPARATUS AND SYSTEM FOR COOPERATIVE RESOURCE SCHEDULING AND COOPERATIVE COMMUNICATION

CROSS-REFERENCE TO RELATED APPLICATIONS

This application is a continuation of International Application No. PCT/CN2010/078710, filed on Nov. 15, 2010, which claims priority to Chinese Patent Application No. 201010113795.9, filed on Feb. 11, 2010, both of which are hereby incorporated by reference in their entireties.

FIELD

The present disclosure relates to mobile communication technology, and more particularly to a method, apparatus and system for cooperative resource scheduling and cooperative communication.

DESCRIPTION OF THE RELATED ART

Cooperative MIMO (Co-MIMO) technology has been regarded as a key physical layer technology in IMT-Advanced Standard. In a cellular system with frequency multiplex in global range, inter-cell interference has become a major factor in limiting the performance of mobile communication, and the fundamental concept of Co-MIMO is to coordinate signal transmissions of a plurality of base stations in order to mitigate inter-cell interference. In a Co-MIMO system, as shown in FIG. 1, a plurality of base stations (BS) will cooperate simultaneously to provide communication service to a plurality of mobile terminals (MS).

In the BS, the wireless environment can be continuously adjusted by Spatial Division Multiple Access (SDMA) to provide each user with downlink signal of high quality. In the network, such advanced BS performance may be used to increase the coverage of the BS, reduce the network cost, improve the system capacity, and ultimately achieve the purpose of improving the frequency utilization. SDMA can be compatible with any spatial modulation mode or frequency band, thereby being of great practical value. SDMA with BS cooperation can further improve spectral efficiency as it can effectively overcome interference problem at cell edge and convert interference into useful signals. BS cooperation is usually defined as data sharing and joint operation among Base stations, where channel information may be shared, partially shared, or not shared. While bringing huge gain, BS cooperation put the overhead more on the network side, which comes with some new problems for the appearing cellular network that: although the cooperation of the whole network may take full advantage of interference, its complexity increases exponentially with the number of users, and the signaling overhead for the network and user resource scheduling is too high; and there will always appear edge effects in the cooperative network, and scalability remains a problem.

The above problems can be effectively addressed by cooperation of the Base stations in a cluster using the cluster as a unit. The cluster is defined as a group of cooperative Base stations participating in data sharing and joint computation. The size of the cluster in a network depends on the backhaul capacity and computational capability of the cluster in the network. However, the current BS cluster dividing scheme in the network, such as fixed and dynamic cluster dividing, etc., all requires a high signaling overhead, such that the loss of the overall performance of the network is relatively high compared with the global cooperation, and the overall performance of the network is not high.

SUMMARY

Embodiments of the disclosure provide a method, apparatus and system for cooperative resource scheduling to improve the overall performance of network.

A method for cooperative resource scheduling, comprising: obtaining, by a network central controller, statistical information of all users dominated by the network central controller in a first time period; dividing the base stations to base station cooperative clusters according to the statistical information; and transmitting cooperative cluster dividing result to the base stations.

A method for cooperative communication, comprising: collecting statistical information of users belonging to in a first time period and transmitting the statistical information to a network central controller; after the first time period has lapsed, receiving cooperative cluster dividing result determined based on the statistical information and transmitted from the central controller; and performing cooperative communication, by a base station, with other base stations in a cooperative cluster according to the cooperative cluster dividing result.

A system for cooperative communication includes base stations and a network central controller. The base stations are configured to collect statistical information of users belonging to the base stations in a first time period and transmitting the statistical information to the network central controller, and after the first time period has lapsed, receiving cooperative cluster dividing result transmitted from the network central controller, and performing cooperative communication with other base stations in a cooperative cluster according to the cooperative cluster dividing result. The network central controller configured to obtain and calculate the statistical information of users in the first time period, dividing the base stations to base station cooperative clusters according to the statistical information, and transmitting the cooperative cluster dividing result to the corresponding base stations.

A network central controller, comprising an information collecting unit configured to obtain statistical information of all the users dominated by it in a first time period; a cooperative cluster dividing unit configured to divide base stations to base station cooperative clusters according to the statistical information and obtain cooperative cluster dividing result; and a transmission unit configured to transmit the cooperative cluster dividing result to the base stations.

A base station, comprising a statistical information processing unit configured to collect statistical information of users belonging to the base station in a first time period and transmit the statistical information to a network central controller; a cluster dividing receiver unit, after the first time period has lapsed, configured to receive cooperative cluster dividing result determined based on the statistical information and transmitted from the network central controller; and a communication unit configured to perform cooperative communication with other base stations in a cooperative cluster according to the cooperative cluster dividing result.

The solutions of the embodiments of the disclosure update the cluster dividing according to the statistical information of the users in the first time period, being capable of reducing the signaling overhead of the system and the difficulty of implementing the whole system, while being capable of improving the fairness of the system users.

DETAILED DESCRIPTION OF THE PREFERRED EMBODIMENTS

Embodiments of the disclosure provide a method and apparatus for resource scheduling and cooperative communication in a cooperative communication.

Figure 1:
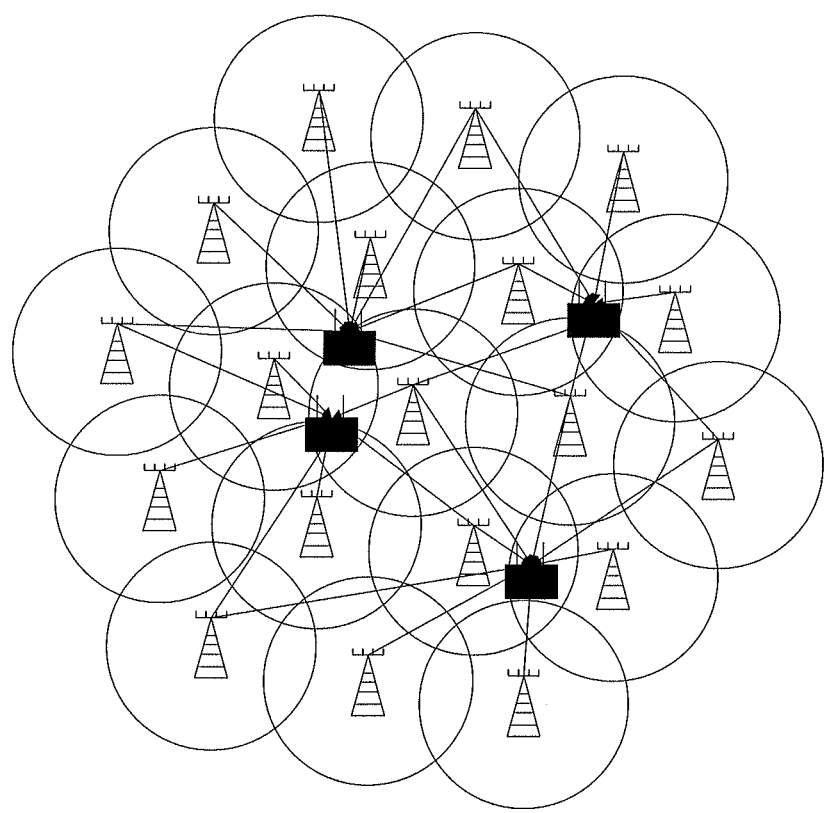
FIG. 1 is a configuration diagram of a cooperative MIMO system according to an embodiment of the disclosure.
Figure 2A:
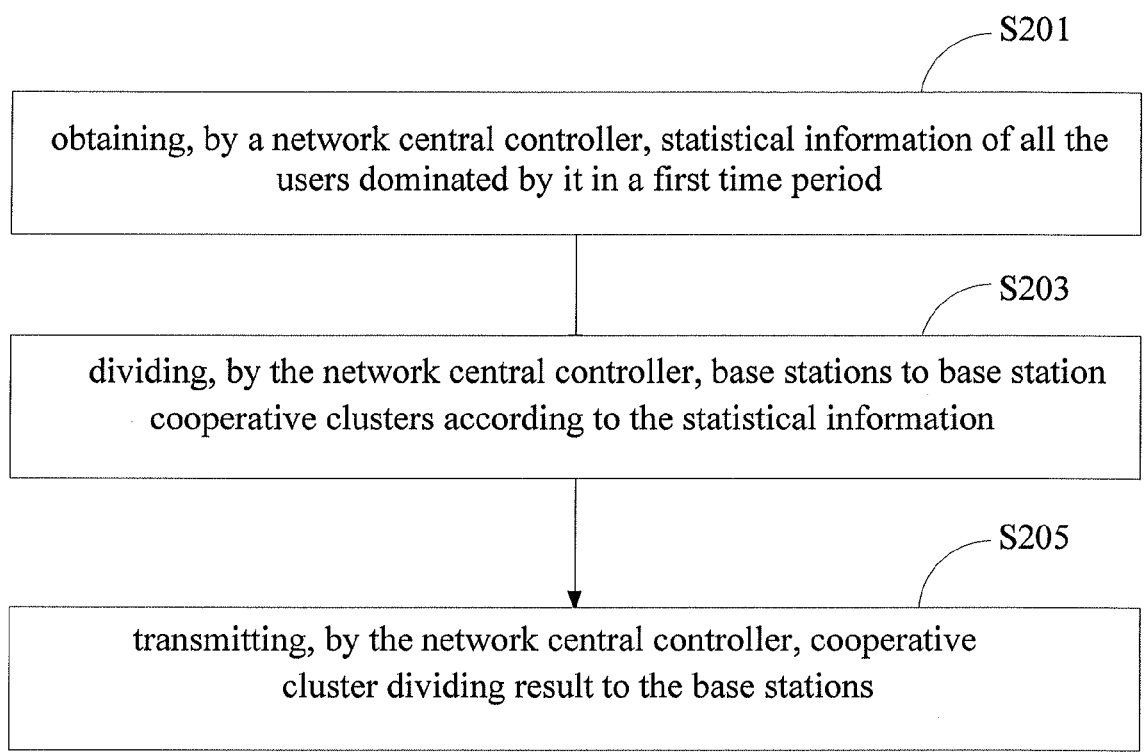
FIG. 2a is a flowchart of a method for cooperative resource scheduling according to an embodiment of the disclosure.

As shown in FIG. 2a, an embodiment of the disclosure discloses a method for cooperative resource scheduling, the method comprising:

at S201, obtaining, by a network central controller, statistical information of all the users dominated by it in a first time period;

at S203, dividing, by the network central controller, base stations to base station cooperative clusters according to the statistical information; and at S205, transmitting, by the network central controller, cooperative cluster dividing result to the base stations.

The cooperative cluster dividing result is used by the Base stations to allocate cooperative resources according to the statistical information of the users belonging to this cooperative cluster in a second time period.

Figure 2B:
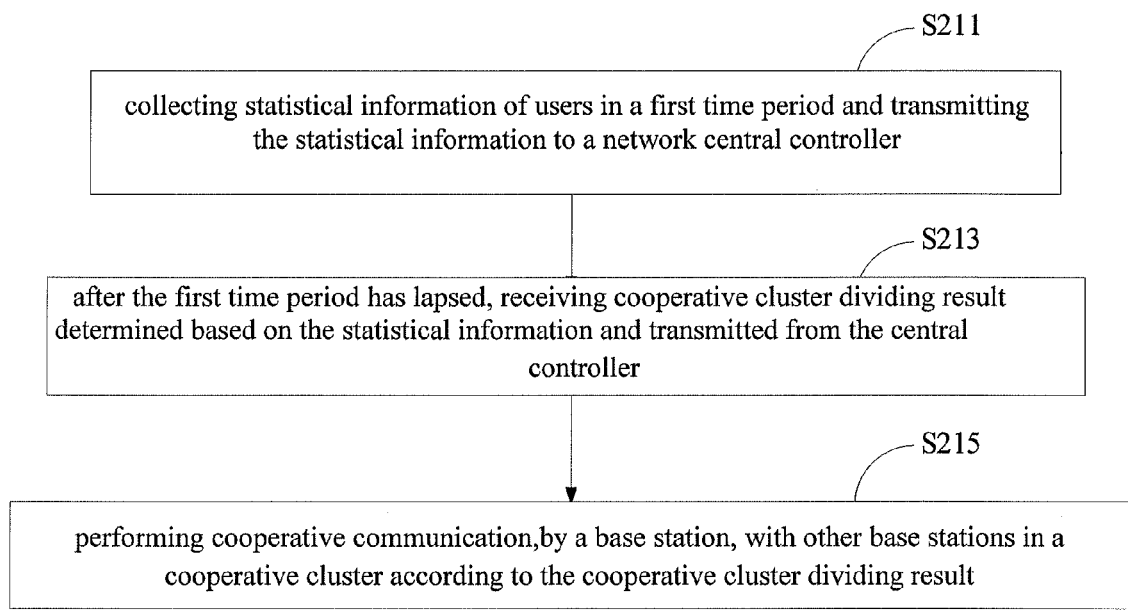
FIG. 2b is a flowchart of a method for cooperative communication according to an embodiment of the disclosure.

As shown in FIG. 2b, another embodiment of the disclosure discloses a method for cooperative communication performed by Base stations, the method comprising:

at S211, collecting statistical information of users belonging to in the first time period and transmitting the statistical information to a network central controller;

at S213, after the first time period has lapsed, receiving cooperative cluster dividing result determined based on the statistical information and transmitted from the network central controller; and at S215, performing cooperative communication, by a base station, with other base stations in a cooperative cluster according to the cooperative cluster dividing result.

Further, in the second time period, the allocation of the cooperative resources is made according to the statistical information of the users belonging to a cooperative cluster, and the BS then performs cooperative communication with other base stations in a cooperative cluster according to the result of the cooperative resources allocation.

The embodiment of the disclosure updates the cluster dividing according to the statistical information of the users in the first time period, which being capable of reducing the signaling overhead of the system and the difficulty of implementing the whole system, while being capable of improving the fairness of the system users.

An embodiment of the disclosure also discloses a system for cooperative communication, which makes communication resource scheduling and complete cooperative communication. The system includes base stations and a network central controller, wherein the base stations collect statistical information of users belonging to the base stations in a first time period and transmit the statistical information to the network central controller, receive cooperative cluster dividing result transmitted from the network central controller and perform cooperative communication with other base stations in a cooperative cluster according to the cluster dividing result after the first time period has lapsed. The network central controller is used for obtaining and calculating the statistical information of the users in the first time period, dividing the base stations to base station cooperative clusters according to the statistical information, and transmitting cooperative cluster dividing result to the corresponding base stations.

Further, in the second time period, the allocation of the cooperative resources is made according to the statistical information of the users belonging to the cooperative cluster in the second time period, and the base station then performs cooperative communication with other base stations in the cooperative cluster according to the result of the cooperative resources allocation.

The solution of the embodiment of the disclosure updates the cluster dividing according to the statistical information of the users in the first time period, which reducing the signaling overhead of the system and the difficulty of implementing the whole system, while being capable of improving the fairness of the system users.

A still further embodiment of the disclosure also discloses a method for scheduling communication resource and completing cooperative communication, in which in a first time period, each base station collects and updates information of all the users, reports the information of all its users to a central processor, then the central processor decides how to make the cluster dividing according to all the information of users, and each base station re-allocates and re-schedules the resources for the users in the cluster depending on the cluster it belongs to, after enough moments, the flow returns and all the above steps are repeated. In this embodiment, in the second time period, the base stations re-share the data information and if necessary also the real-time channel information according to the new cluster dividing; base station controller schedules the users, and decides the communication mode as well as the allocation of resources in the cluster; and the base station updates the recorded average information of users. After completing the allocation of resources, the base station and other base stations in the cluster make cooperative communications for the users. In the instance, the first time period is much larger than the second time period. If the first time period is defined as $T_p$, and the second time period as $T_s$, $T_p = N_p T_s$, where $N_p \gg 1$.

During particular implementation, three-layer and/or two-layer network architecture may be designed. The network central controller is a logical unit, which may physically be a separated central controlling entity, or the functionality of which may be realized by the appearing network units.

Figure 3:
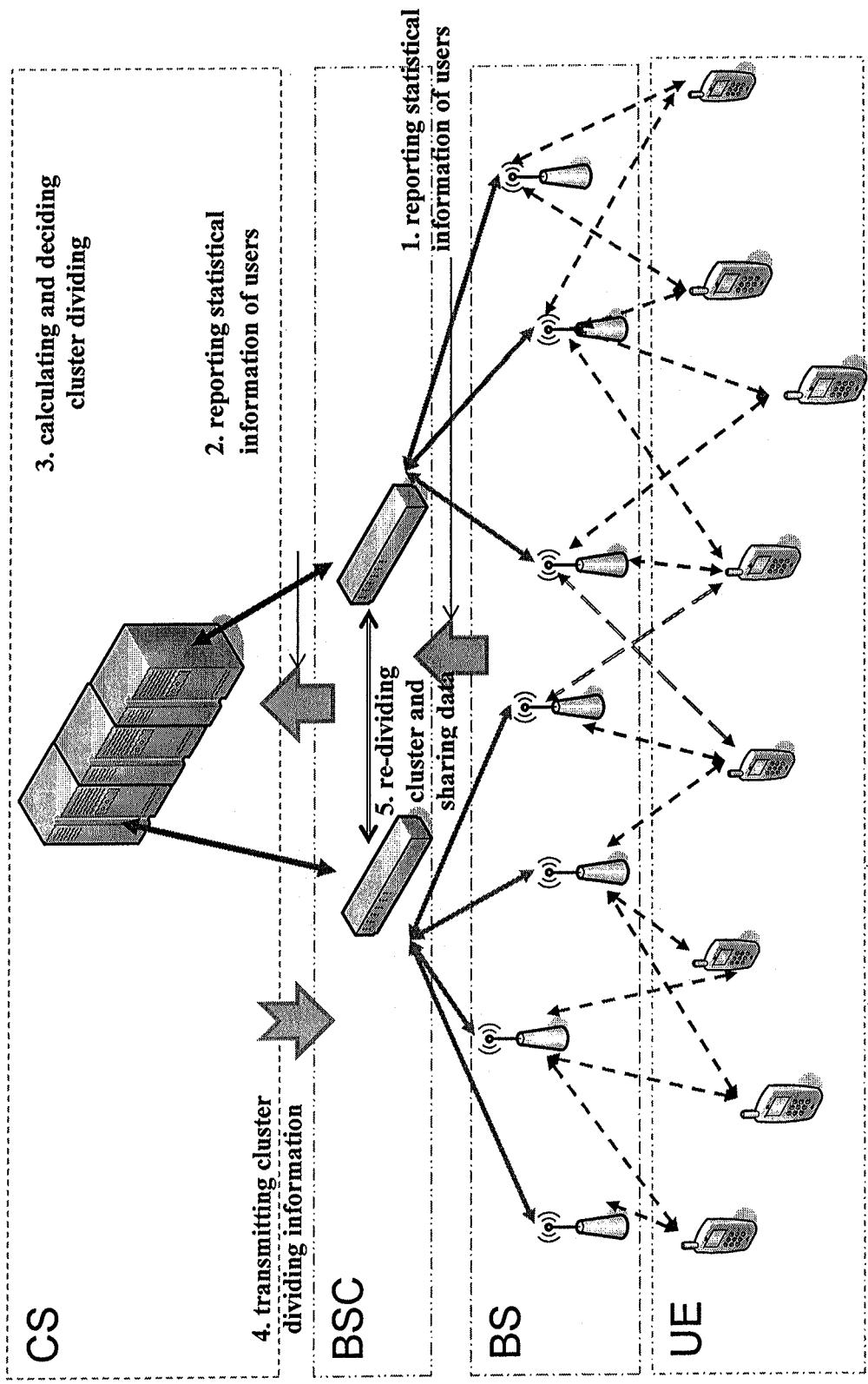
FIG. 3 is an architectural diagram of a three-layer network architecture according to an embodiment of the disclosure.

As shown in FIG. 3, an embodiment of three-layer network architecture is illustrated. The first layer is the Base stations, among which the cooperative communication may be performed for the end-users. The second layer is the BSCs, which perform optimization and share data in the cooperative cluster. The third layer is the network central controller (CS), which calculates and decides the cooperative cluster dividing. Each BS periodically feeds back to the BSC all its users' queue or related statistical information, thereafter the BSC transmits the information received from its managed Base stations to the network central controller. The network central controller divides the base stations to base station cooperative clusters according to the current overall queue or the related statistical information.

In a particular implementation, the statistical information includes length of the user queue or potential function of the length of the user queue. The cooperative cluster dividing of the base stations according to the statistical information may include the cooperative cluster dividing on the principle that the potential function of the overall queue information or the sum of the potential functions of the respective user queue information is minimum. It is the potential function that is used during the cluster dividing, however, the potential function can be calculated in the network central controller or in the base stations. Therefore, the collected statistical information may be the length of queue, or the potential function of each user. If the potential function of the length of queue is calculated by the network central controller, it only needs to receive the length of user queue transmitted from the base stations.

In a particular implementation, the statistical information includes the time average rate of the users or the utility function of the time average rate or the gradient of the utility function of the time average rate. The cooperative cluster dividing of the base stations according to the statistical information may comprise calculating the gradient of the utility function of the average rate of all the users, obtaining the probability that each cluster dividing result appears according to the calculated gradient, and determining the selected cooperative cluster dividing according to the probability. It is the gradient of the utility function of the time average rate that is used in the cluster dividing, where the time average rate of the users refers to the average of the data rate of the users over the time. The gradient of the utility function of the time average rate may be calculated by the base stations, or by the network central controller. The gradient of the utility function of the time average rate may be obtained by calculating the time average rate or the utility function of the time average rate of the users. Therefore, the statistical information may include the time average rate or the utility function of the time average rate of the users.

The network central controller transmits the divided cooperative cluster dividing result to the BSC, which updates the information of the base stations managed by it according to the new cooperative cluster dividing result. Then the BSC notifies the cooperative cluster dividing result to the base stations managed by it, the base stations make the data sharing and information exchange in the cooperative cluster and complete the allocation of the cooperative resources. Finally, the base stations in each cooperative cluster provide cooperative service to the users (UE).

Figure 4:
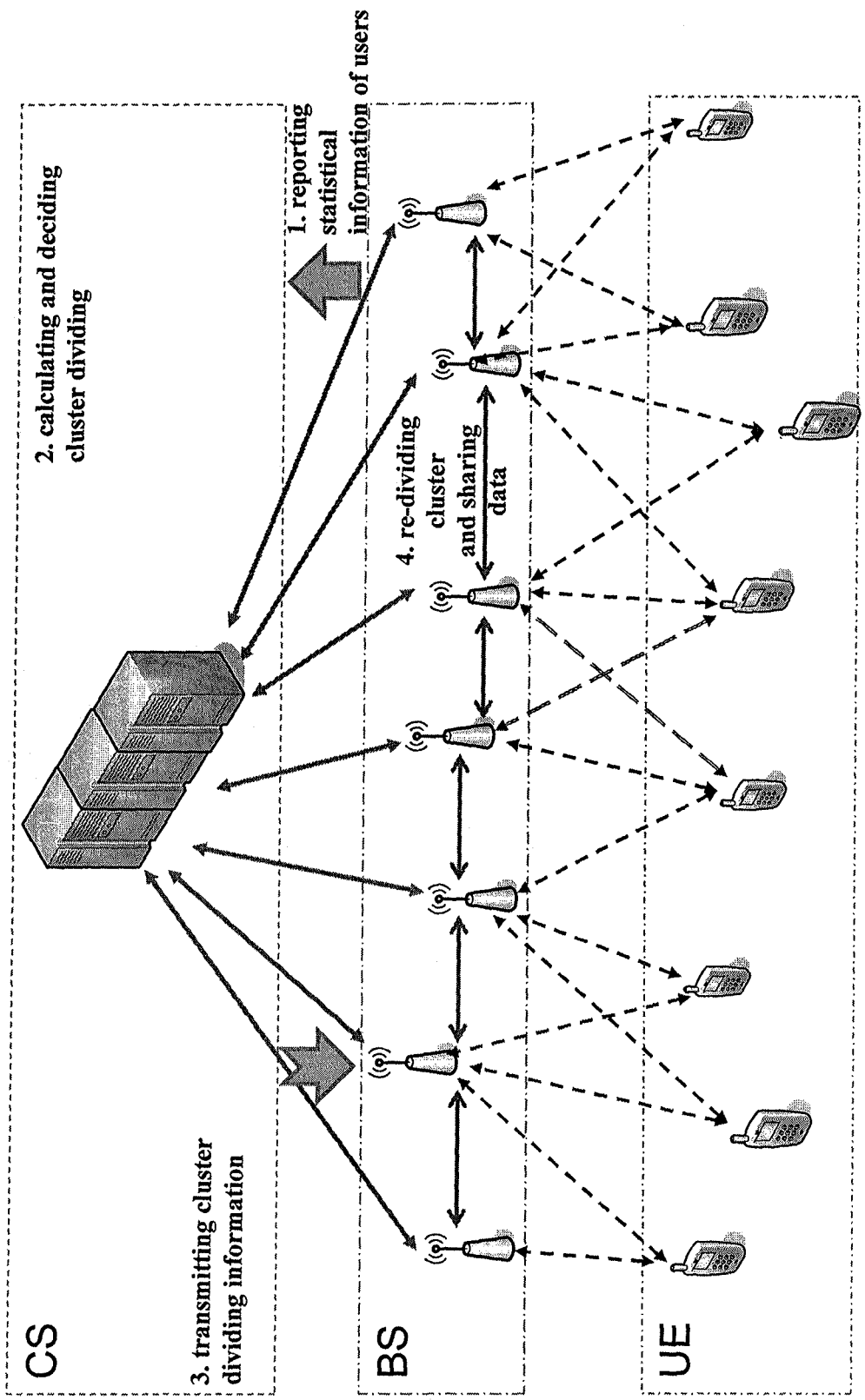
FIG. 4 is an architectural diagram of a two-layer network architecture according to an embodiment of the disclosure.

As in FIG. 4, an embodiment of a two-layer network architecture is illustrated. The first layer is the base stations, among which the cooperative communication may be performed for the end-users. The second layer is the network central controller (CS), which calculates and decides the cooperative cluster dividing. Each BS periodically feeds back to the network central controller all its user queues or related statistical information. The network central controller makes the cooperative cluster dividing of the base stations according to the overall statistical state of all current users, updates the cluster dividing information according to the new cooperative cluster dividing result, and updates the information of the managed base stations. The network central controller notifies the new cluster dividing result to all Base stations. Each base station performs the corresponding data sharing and information exchange in the cooperative cluster, and completes the allocation of the cooperative resources. Finally, the base stations in each cooperative cluster provide cooperative services to the users. The cooperative cluster dividing process in the two-layer network architecture is substantially the same as that in the three-layer network architecture.

In an embodiment, if the statistical information includes the length of the user queue or potential function of the length of the user queue, the particular cluster dividing process is as follows.

The network central controller updates length of all its user queues with $T_p$ as time unit, and selects the cluster dividing of all base stations for the next time unit $T_p$ depending on the overall state of the current queues.

At the time of $T_p$, respective base stations feed back to the network central controller simultaneously the queue state or the potential function of the queue state of all its users; the central controller calculates the potential function of the whole network according to the current overall queue state, and selects the corresponding optimal cluster dividing according to the calculated potential function; and the central controller notifies the cluster dividing information to all base stations.

The BS performs cooperative communication with other base stations in the cluster, and at each time of $T_s$:

the BS may share data and channel information with other base stations in the cooperative cluster to which it belongs, where the sharing may be completed in the BSC, or may be shared to some BS (main BS). Channel information may also not be shared. The joint pre-coding is performed in the downlink communication, and the joint detection is utilized in the uplink communication. In the downlink communication, power is allocated to the users in the cluster based on the waterfilling principle by using the potential function as a parameter. If the power allocation in the cluster can reach Nash Equilibrium among clusters, the time delay of the whole network can be lowered to minimum.

In addition, if the user's own potential function is calculated by himself, it may be updated in each second time period.

In a particular example, for the purpose of minimizing the time delay, the information of the user queue is collected and the cluster dividing is selected according to the potential function of the queue information; and for the purpose of maximizing the average utility function, then the average rate of the users is collected, the probability of the cluster dividing is updated according to the gradient of the utility function of the average rate, and the cluster dividing is selected according to the probability.

For case of time delay, the potential function of the user is updated in the second time period (may be real time) according to the change of the user queue in the cluster, and the power allocation of the user is adjusted according to the difference of the potential functions before and after updating. For case of utility function, in the second time period, for the purpose of maximizing the utility function of the cooperative cluster, the users in the cluster are selected in conjunction with other base stations in the cooperative cluster, and in the second time period, only the statistical average rate of the users in the cluster is updated; however, the data is not used to adjust the allocation of the resources of the cooperative communication in the cluster. Herein the real time information (for example real time channel information) is also defined as the statistical information in the second time period, therefore these information will be required in each second time period to re-calculate the pre-coding matrix, the user selections, and the power allocations, etc.

In an embodiment, if the statistical information includes the time average rate or the utility function of the time average rate or the gradient of the utility function of the time average rate of the users, the particular cluster dividing process will be as follows:

The network central controller updates the gradient of the utility function of the average rate of all its users with $T_p$ as time unit, calculates the probability that all the cluster dividing appears, and selects the cluster dividing of all the base stations for the next time unit $T_p$ according to the probability:

At the moment of $T_p$, the respective base stations feed back to the central controller simultaneously the related information of the average rate of all their users; the BSC calculates the gradient of the utility function of the whole network according to the utility function of the related information of the current overall average rate, and updates the probability that the cluster dividing appears with the use of this gradient, and selects corresponding optimal cluster dividing according to the calculated probability; and the BSC notifies the cluster dividing information to all the base stations.

The BS performs cooperative communication with other base stations in the cluster in time of $T_p$, and at each time of $T_s$:

the BS shares data and channel information (the channel information may be not shared) with other base stations in the cooperative cluster to which it belongs; for the purpose of maximizing the utility function of the current cluster, the users in the cluster are selected in conjunction with all the base stations in the cluster; and joint pre-coding is performed in the downlink communication, and joint detection is utilized in the uplink communication; in the downlink communication, power is allocated to the users in the cluster based on the waterfilling principle.

In addition, in each time of $T_s$, the BS or the user needs to update the related information of average rate of the user itself.

As further process of the inventive embodiment, a set of the cooperative cluster dividing results may also be stored after the cluster dividing of the base stations according to the statistical information, then from which the cluster dividing result is selected and transmitted to the BS. There may store all or part of the cluster dividing selections of the network, for example, in the network central controller. The selection may be made to minimize the time delay or maximize the utility function.

Figure 5:
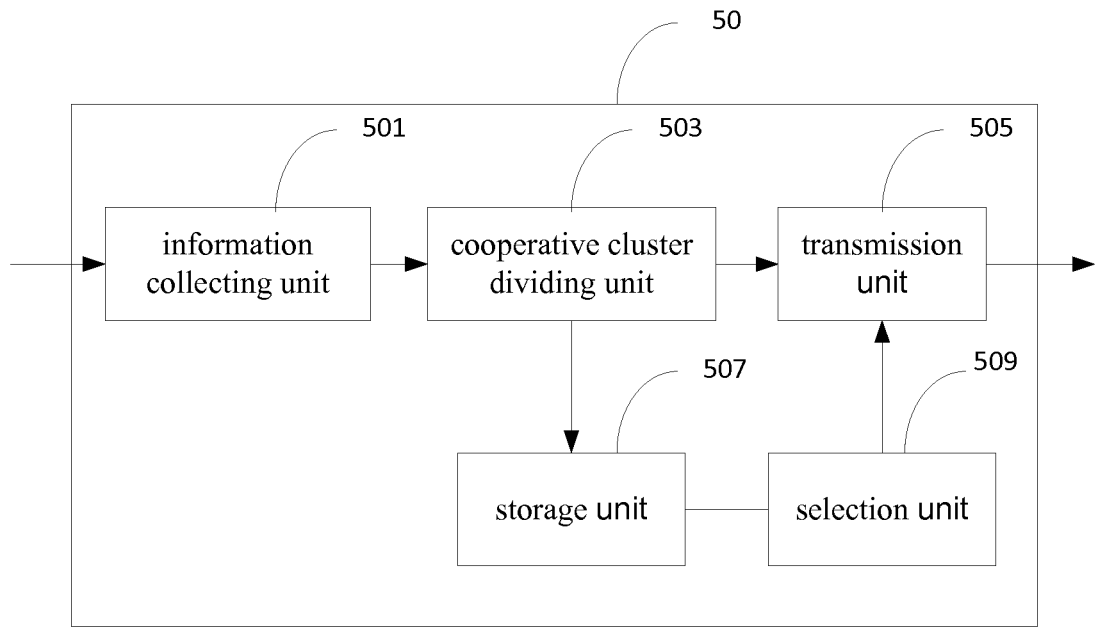
FIG. 5 is a schematic configuration diagram of a network central controller according to an embodiment of the disclosure.

An embodiment of the disclosure provides a network central controller, as shown in FIG. 5, the network central controller 50 comprises an information collecting unit 501, a cooperative cluster dividing unit 503, and a transmission unit 505.

The information collecting unit 501 is used for obtaining the statistical information of all its dominated users in the first time period;

The cooperative cluster dividing unit 503 is used for dividing base stations to base station cooperative cluster according to the statistical information to obtain the cooperative cluster dividing result, wherein the cooperative cluster dividing result is used by the base stations to allocate the cooperative resources according to the statistical information of the users belonging to the cooperative cluster in the second time period.

The transmission unit 505 is used for transmitting the cooperative cluster dividing result to the base stations.

In an implementation, the statistical information obtained by the information collecting unit 501 includes the potential function of the user queue length. The cooperative cluster dividing unit 503 performs the cooperative cluster dividing on the principle that the potential function of the overall queue information or the sum of the potential functions of respective user queue information is minimum. In another implementation, the statistical information obtained by the information collecting unit 501 includes the gradient of the utility function of the time average rate of the users. The cooperative cluster dividing unit 503 calculates the gradient of the utility function of the average rate of all users, obtain the probabilities that the respective cooperative cluster dividing results appear according to the obtained gradient, and determines the selected cooperative cluster dividing according to the probabilities.

Further, the network central controller may also include a storage unit 507 for storing set of the cooperative cluster dividing results after completing the cooperative cluster dividing of the base stations according to the statistical information; and a selection unit 509 for selecting the cooperative cluster dividing result from the storage unit 507, and the selected cluster dividing result is transmitted to the BS by the transmission unit 505.

Figure 6:
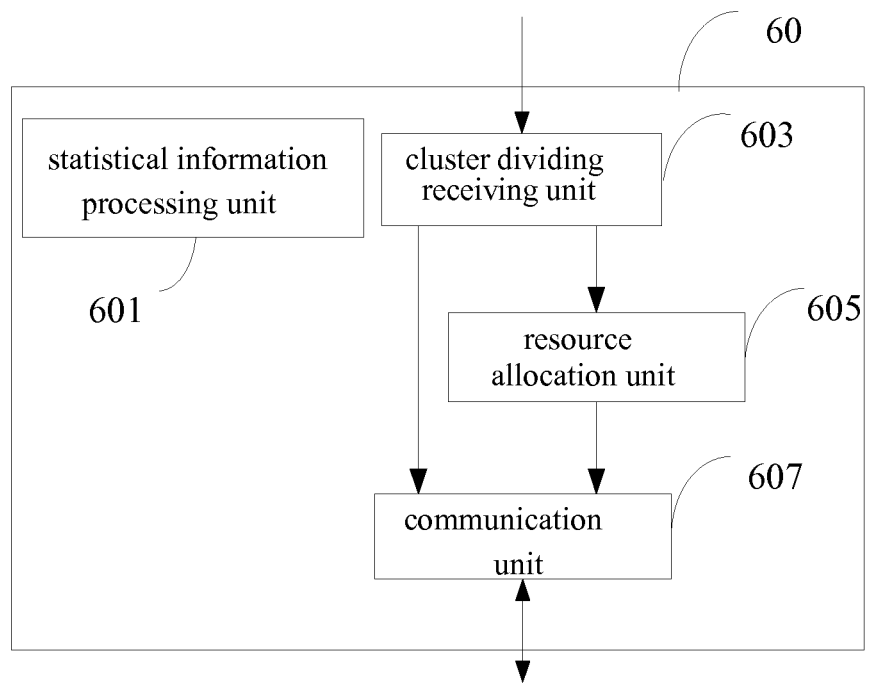
FIG. 6 is a schematic configuration diagram of a BS according to an embodiment of the disclosure.

An embodiment of the disclosure also provides a BS, as shown in FIG. 6, the BS 60 comprises:

a statistical information processing unit 601 for collecting and transmitting the statistical information of the belonged users to the network central controller 50 in the first time period;

a cluster dividing receiving unit 603 for receiving the cooperative cluster dividing result determined by the statistical information and transmitted from the network central controller 50 after the first time period has lapsed;

a resource allocation unit 605 for allocating the cooperative resources based on the statistical information of the users belonging to the cooperative cluster in the second time period, according to the cooperative cluster dividing result; and a communication unit 607 for performing cooperative communication with other base stations in the cooperative cluster after completing the allocation of the resources.

In an implementation, the statistical information processed by the statistical information processing unit 601 includes the potential function of the user queue length, the resource allocation unit 605 updates the potential function of the user queue length in the second time period, and adjusts the user power allocation based on the difference of the potential functions before and after updating.

In another implementation, the statistical information processed by the statistical information processing unit 601 includes the potential function of the user queue length, the resource allocation unit 605 updates the potential function of the user queue length in the second time period, and adjusts the user power allocation based on the difference of the potential functions.

The communication apparatus of the embodiments of the disclosure updates the cluster dividing in the first time period, and the dynamic cluster dividing mode of the allocation of the resources in the cluster in the second time period can increase the transmission rate and the user experience to the users at the edge of the cluster, and improve the fairness of the system users, while reducing the signaling overhead of the system, separating the computational tasks and reducing the difficulty of implementing the whole system.

Person of ordinary skill in the art will understand that, all or part of the process to achieve the method of the above embodiments can be completed through a computer program to instruct related hardware, the program can be stored in a computer-readable storage medium, the program at execution, may include flows of the methods of above embodiments. The storage medium may be the magnetic disks, CD, read-only storage memory (ROM) or random access memory (RAM), etc.

What is claimed is:

1. A method for cooperative resources scheduling, the method comprising:

obtaining, by a network central controller, statistical information of all users dominated by the network central controller in a first time period;

dividing, by the network central controller, base stations to base station cooperative clusters according to the statistical information;

transmitting cooperative cluster dividing result to the base stations, wherein the statistical information comprises a gradient of a utility function of a time average rate of the users and the time average rate of the users comprises an average of data rate of the users over the time, and wherein the statistical information further comprises a potential function of queue length of the user; and updating the potential function of queue length of the user and adjusting user power allocation based on a difference of the potential function before and after updating.

2. The method of claim 1, wherein the base stations use the cooperative cluster dividing result to allocate cooperative resources according to the statistical information of the users belonging to a cooperative cluster in a second time period.

3. The method of claim 1, wherein
wherein dividing base stations to base station cooperative clusters according to the statistical information comprises: dividing base stations to base station cooperative clusters such that an potential function of overall queue information is minimized or a sum of the potential functions of respective user queue information is minimized.

4. The method of claim 1, wherein
dividing base stations to base station cooperative clusters according to the statistical information comprises calculating the gradient of the utility function of the average rate of all users, and obtaining probabilities that respective cluster dividing results appear according to the obtained gradient, and
determining the selected cooperative cluster dividing according to the probabilities.

5. The method of claim 2, wherein the method further comprises:
storing a set of the cooperative cluster dividing results after dividing base stations to base station cooperative clusters according to the statistical information; and
selecting a cooperative cluster dividing result from the set and transmitting the cooperative cluster dividing result to the base stations.

6. A method for cooperative communication, the method comprises:
collecting statistical information of users in a first time period and transmitting the statistical information to a network central controller;
after the first time period has lapsed, receiving cooperative cluster dividing results determined based on the statistical information and transmitted from the central controller;
performing cooperative communication, by a base station, with other base stations in a cooperative cluster according to the cooperative cluster dividing results, wherein the statistical information comprises a gradient of a utility function of a time average rate of the users and the time average rate of the users comprises an average of data rate of the users over the time, and wherein the statistical information further comprises a potential function of queue length of the user; and
updating the potential function of queue length of the user and adjusting user power allocation based on a difference of the potential function before and after updating.

7. The method of claim 6, wherein after receiving the cooperative cluster dividing results, the cooperative resources is allocated according to the statistical information of the users belonging to the cooperative cluster in a second time period.

8. The method of claim 7, wherein the potential functions of queue length of the users are updated in the second time period, and the first time period $T_p$ is larger than the second time period $T_s$, $N_p$ is a number greater than 1 and where $T_p = N_p T_s$.

9. The method of claim 7, wherein the statistical information of the users comprises a gradient of a utility function of a time average rate; and in the second time period, for the purpose of maximizing the utility function of the cooperative cluster, selecting the users in the cluster in conjunction with other base stations in the cooperative cluster, and completing the allocation of resources.

10. A system for cooperative communication, comprising base stations and a network central controller, wherein
the base stations comprise one or more processors, a non-transitory storage medium storing instructions when executed by the one or more processors cause the one or more processors to perform acts comprising: collecting statistical information of users belonging to the base stations in a first time period and transmitting the statistical information to the network central controller, and after the first time period has lapsed, receiving cooperative cluster dividing result transmitted from the network central controller and performing cooperative communication with other base stations in a cooperative cluster according to the dividing result;
the network central controller comprises a controller processor, a second non-transitory storage medium storing instructions when executed by the controller processor cause the controller processor to perform acts comprising: obtaining and calculating the statistical information of the users in the first time period, dividing the base stations to base station cooperative clusters according to the statistical information, and transmitting the cooperative cluster dividing result to the corresponding base stations;
the statistical information comprises a gradient of a utility function of a time average rate of the users and the time average rate of the users comprises an average of data rate of the users over the time, and the statistical information further comprises a potential function of queue length of the user; and
the second non-transitory storage medium storing instructions when executed by the controller processor cause the controller processor to further perform acts comprising: updating the potential function of queue length of the user and adjusting user power allocation based on a difference of the potential function before and after updating.

11. The system of claim 10, wherein the network central controller divides base stations to base station cooperative clusters such that the potential function of the overall queue information or a sum of the potential functions of respective user queue information is minimized.

12. The system of claim 10, wherein the statistical information comprises a time average rate of the users or a utility function of the time average rate or a gradient of the utility function of the time average rate; and
the network central controller calculates the gradient of the utility function of the average rate of all the users, obtains probabilities that respective cooperative cluster dividing results appear according to the obtained gradient, and determines the selected cooperative cluster dividing according to the probabilities.

13. The system of claim 10, wherein the base stations allocate the cooperative resources according to the statistical information of the users belonging to a cooperative cluster in a second time period, after receiving the cooperative cluster dividing result.

14. A central controller comprising a hardware processor, a non-transitory storage medium storing instructions when executed by the hardware processor cause the hardware processor to perform acts comprising:
obtaining statistical information of all users dominated by it in a first time period;
dividing base stations to base station cooperative clusters according to the statistical information and obtaining cooperative cluster dividing result;
transmitting the cooperative cluster dividing result to the base stations, wherein the statistical information comprises a gradient of a utility function of a time average rate of the users and the time average rate of the users comprises an average of data rate of the users over the time, and wherein the statistical information further comprises a potential function of queue length of the user; and
updating the potential function of queue length of the user and adjusting user power allocation based on a difference of the potential function before and after updating.

15. The central controller of claim 14, wherein the cooperative cluster dividing result is used by the base stations to allocate cooperative resources according to the statistical information of the users belonging to a cooperative cluster in a second time period.

16. The central controller of claim 14, wherein the statistical information comprises potential function of queue length of the users; and
the central controller divides base stations to base station cooperative clusters such that the potential function of the overall queue information or the sum of the potential functions of respective user queue information is minimized.

17. The central controller of claim 14, wherein the statistical information comprises a gradient of a utility function of a time average rate of the users; and
the central controller calculates the gradient of the utility function of the average rate of all the users, obtains probabilities that respective cluster dividing results appear according to the obtained gradient, and determines the selected cooperative cluster dividing according to the probabilities.

18. The central controller of claim 14, further stores a set of the cooperative cluster dividing results after dividing the base stations to base station cooperative clusters according to the statistical information.

19. The central controller of claim 14, further selects the cooperative cluster dividing result, and transmit the selected cooperative cluster dividing result to the base stations.

20. A base station comprising a hardware processor and a non-transitory storage medium, the base station configured to:
collect statistical information of users belonging to the base station in a first time period and transmitting the statistical information to a network central controller;
after the first time period has lapsed, receive cooperative cluster dividing result determined on the statistical information and transmitted from the network central controller; and
perform cooperative communication with other base stations in a cooperative cluster according to the cooperative cluster dividing result, wherein the statistical information comprises a gradient of a utility function of a time average rate of the users and the time average rate of the users comprises an average of data rate of the users over the time, and wherein the statistical information further comprises a potential function of queue length of the user; and
update the potential function of queue length of the user and adjust user power allocation based on a difference of the potential function before and after updating.

21. The base station of claim 20, further configured to allocate the cooperative resources based on the statistical information of the users belonging to a cooperative cluster in a second time period, according to the cooperative cluster dividing result.

22. The base station of claim 20, wherein the base station updates the potential function of the queue length of the users in a second time period and the first time period $T_p$ is larger than the second time period $T_s$, $N_p$ is a number greater than 1 and where $T_p = N_p T_s$.

* * * * *